(12) United States Patent
Craik

(10) Patent No.: US 11,397,099 B2
(45) Date of Patent: Jul. 26, 2022

(54) INFORMATION DISPLAY APPARATUS

(71) Applicant: Operative Product Solutions, LLC, Louisville, CO (US)

(72) Inventor: John Craik, Broomfield, CO (US)

( * ) Notice: Subject to any disclaimer, the term of this patent is extended or adjusted under 35 U.S.C. 154(b) by 577 days.

(21) Appl. No.: 16/550,667

(22) Filed: Aug. 26, 2019

(65) Prior Publication Data

US 2020/0064165 A1 Feb. 27, 2020

Related U.S. Application Data

(60) Provisional application No. 62/722,956, filed on Aug. 26, 2018.

(51) Int. Cl.
*G01D 13/24* (2006.01)
*G09F 7/20* (2006.01)
*G01D 11/30* (2006.01)

(52) U.S. Cl.
CPC ............ *G01D 13/24* (2013.01); *G01D 11/30* (2013.01); *G09F 7/20* (2013.01)

(58) Field of Classification Search
CPC ........ G01D 13/24; G01D 11/30; G01D 13/10; G01D 13/04; G09F 7/20
USPC .................................................. 116/200, 278
See application file for complete search history.

(56) References Cited

U.S. PATENT DOCUMENTS

| | | |
|---|---|---|
| 1,723,390 A | 8/1929 | Tingley |
| 1,960,748 A | 5/1934 | Meunier |
| 2,829,620 A | 4/1958 | Hart |
| 4,033,057 A | 7/1977 | Jaffe |
| 4,246,712 A | 1/1981 | Wall |
| 5,138,784 A | 8/1992 | Niwa |
| 5,311,688 A | 5/1994 | Aeschbacher et al. |
| 5,679,903 A | 10/1997 | Mock |
| 5,765,501 A | 6/1998 | Tung et al. |
| 6,226,912 B1 | 5/2001 | Tackett et al. |
| 2009/0109633 A1* | 4/2009 | Rajala ............... H05K 5/066 361/679.01 |
| 2011/0139062 A1 | 6/2011 | Chen |
| 2011/0283932 A1 | 11/2011 | Chen |
| 2015/0268071 A1* | 9/2015 | Gass ............... G01D 11/245 73/431 |
| 2015/0271936 A1* | 9/2015 | Stringer ............... H02G 5/025 361/728 |
| 2017/0258662 A1* | 9/2017 | Armbrust ............... A61C 7/14 |
| 2021/0131837 A1* | 5/2021 | Ruch ............... G01N 27/283 |

FOREIGN PATENT DOCUMENTS

GB 2270408 A 3/1994

\* cited by examiner

*Primary Examiner* — Muhammad Ijaz

(57) ABSTRACT

An adjustable information display apparatus for industrial, commercial, or domestic applications is described herein. The apparatus can include a band and a faceplate attached to the band. The band can be removably securable to an exterior surface of an object, such as an industrial gauge or pipe. The faceplate can be configured to receive one or more detachable components, such as one or more visual indicators or signage panels.

20 Claims, 17 Drawing Sheets

INFORMATION DISPLAY APPARATUS

CROSS-REFERENCE TO RELATED APPLICATION

This application claims the benefit of U.S. Provisional Patent Application No. 62/722,956 filed Aug. 26, 2018, which is hereby incorporated by reference in its entirety as if fully set forth in this description.

FIELD

This disclosure relates to information displays for industrial, commercial, or domestic applications. More specifically, this disclosure relates to adjustable information displays that convey process, maintenance, equipment, or safety information to personnel in industrial environments.

BACKGROUND

Manufacturing facilities often require personnel to monitor and control process and equipment conditions through a combination of process control-based systems and field-based instrumentation, such as dial gauges. Over the years, most facilities have focused on improving process control-based systems. However, field-based personnel also need to be able to read, comprehend, and interpret hundreds of data points collected from field-based instrumentation to effectively manage their areas of responsibility. Additionally, there are other field-based informational requirements that personnel rely upon to manage other important aspects of their roles, such as training, situational awareness, and performing maintenance activities.

In a manufacturing facility, such as a petroleum refinery, field-based personnel may be required to monitor numerous process variables, such as temperatures, pressures, levels, viscosities, and flow rates, at multiple locations throughout the facility to verify that a process is operating safely and effectively. Monitoring process variables may require an individual to travel throughout a large facility having extensive piping and visually inspect a significant number of gauges to ensure the process is operating within predetermined guidelines. If a gauge displays an unacceptable value, personnel must take appropriate steps to return the process parameter to an acceptable value.

In other instances, personnel may be required to perform maintenance on equipment in the facility. While performing maintenance, personnel may be exposed to potentially harmful conditions such as confined spaces or fluids at elevated temperatures or pressures. These conditions can expose personnel to risk of bodily injury.

BRIEF SUMMARY

The adjustable information display apparatus described herein can convey a variety of useful information to facility personnel in industrial applications. In one example, the information display apparatus can attach to an industrial gauge and allow personnel to quickly and accurately determine if a process variable is normal, within an acceptable range, or outside an acceptable range. In another example, the information display can attach to an industrial object, such as an entry point to a confined space, and retain safety information or regulatory permits. In yet another example, the information display can attach to an exterior of a pipe and convey a flow direction, fluid type, safety warning, or other important information. In still another example, the information display can include a machine-readable optical label that can be scanned to retrieve identifying information or to associate process data with process location.

The adjustable information apparatus described herein provides a convenient, cost-effective way to reduce cognitive workload on facility personnel. Reducing cognitive workload on personnel can improve safety and performance by allowing personnel to visually determine if process parameters are within acceptable ranges without relying heavily on memory. Consequently, the apparatus described herein converts what is now largely a cognitive task that relies heavily on memory to a simple, visual task where information is presented clearly, reliably, and in context to improve decision-making and performance of facility personnel.

DETAILED DESCRIPTION

Figure 1:
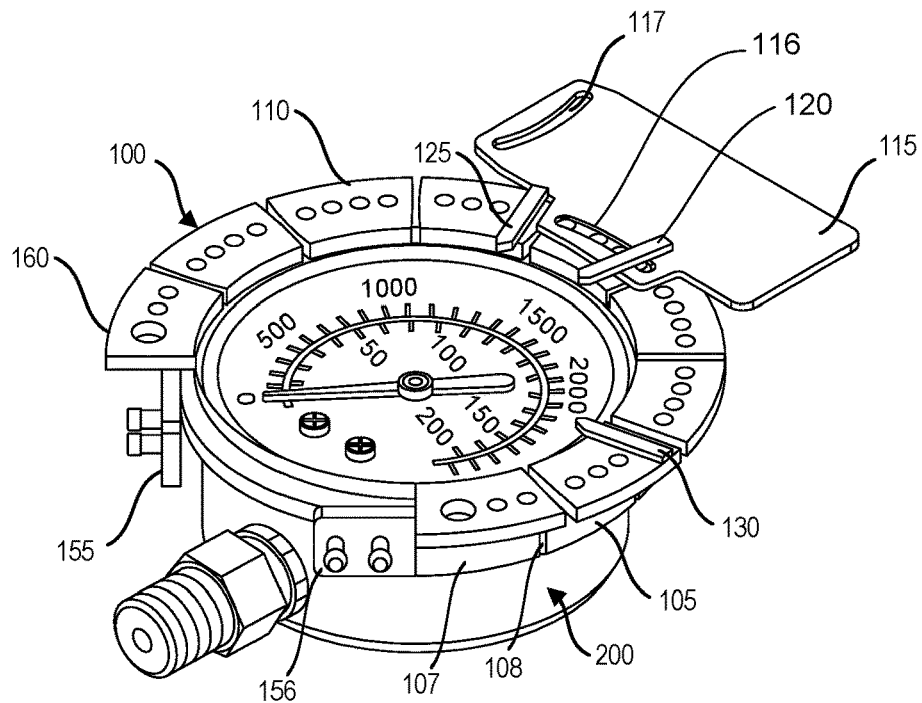
FIG. 1 shows a front perspective view of an information display apparatus installed on an industrial dial gauge.

Field operators at manufacturing facilities must establish and maintain situational awareness of both process and equipment conditions within their scope of responsibility. A field operator regularly monitors field-based data points during their shift. This field-based data may be gathered from a number of different technologies, methods, and equipment. A majority of field-based process and equipment data may be collected from dedicated instrumentation, such as dial gauge indicators, that can measure a number of different process variables, such as pressure, temperature, level, flow, etc. When gathering field-based data, the field operator may visually observe a needle indicator pointing to a value on a preset scale that represents a condition or measured value of a process or equipment condition. The field operator then needs to determine if the indicated data is normal, abnormal, and/or within a safe operating range or parameter. Since dial gauge indictors lack an ability to set, adjust, or indicate a normal or abnormal value or value range, the field operator needs to remember what is normal, abnormal, and within an acceptable range for many data collection points in the facility.

When activities of field operators are analyzed from a human factors perspective, and the number of dial gauges that each field operator monitors during a work shift is considered (e.g. hundreds of dial gauges within a span of control or thousands of dial gauges across a complex site such as an oil refinery), the resultant cognitive workload is significant. To overcome this cognitive workload, some field operators make pen markings on the face of each dial gauge to indicate normal parameters or other process parameters. Design deficiencies of dial gauges, combined with informal, uncontrolled approaches used by some field operators, such as pen markings, may increase the risk of human error and may result in injury to personnel or financial loss to facility owners.

An opportunity exists to reduce the cognitive workload on field operators as they interact with numerous information points during their work shift and thereby enable field operators to better perform their duties during normal, abnormal, and emergency situations.

In one example, the apparatus 100 described herein allows an end-user to attach one or more colored visual indicators to a faceplate. The visual indicators can be positioned on the faceplate to identify specific conditions, such as normal operation, abnormal operation, or a suitable range of operation. The apparatus may allow the end-user to convert a largely memory-based activity into a visual activity (e.g. an activity that can be completed at a glance), thereby significantly reducing cognitive demand and reducing risk of human error. The apparatus may incorporate a number of human factor elements that may enhance benefits for end users, such as but not limited to, improved visual acuity, color coding, and adaptability.

The apparatus 100 may be used in industrial process facilities or any other application where information is available locally to support work systems and processes that end users rely on to ensure safe, efficient, injury-free, and incident-free operation.

The apparatus 100 may be suitable for industry sectors and enterprises that operate manufacturing, storage, or distribution facilities or infrastructure. These facilities may require personnel to monitor and operate process and equipment conditions through a combination of complex and simplistic process control-based systems and field-based industrial instrumentation. Each system may provide information critical to ensure safe, reliable, and efficient operation.

An adjustable information display apparatus 100 is described herein that can present useful process and equipment information in industrial applications. In one example, the apparatus can attach to a gauge and allow personnel to accurately and efficiently determine if a process variable is within an acceptable range. In another example, the apparatus can attach to an industrial object, such as an entry point of a confined space, and present safety information, maintenance procedure information, or regulatory permits. In yet another example, the apparatus can attach to an exterior surface of a pipe and convey a flow direction, fluid type, or safety warning. In still another example, the information display can include a machine-readable optical label that can be scanned to retrieve identifying information or to associate collected or observed process data with a process location.

FIG. 1 shows a perspective view of an information display apparatus 100 installed on a dial gauge 200. The information display apparatus 100 can include a band 105. The band 105 may be securable around an exterior circumference of an industrial object, such as an industrial gauge 200 or pipe. The band 105 may include a plurality of flexibility grooves 108 positioned along an outer surface 107 of the band to enhance flexibility and thereby allow the band to fit around a range object sizes and a variety of object shapes. Enhanced flexibility may allow a band 105 to fit on a variety of gauges from different manufacturers, thereby allowing the band to serve as a universal band that does not need to be designed or ordered for a specific make and model of gauge.

The band 105 may include one or more materials that can withstand a range of temperatures and conditions relevant to an environment, equipment, or process that the band 105 is exposed to without experiencing significant physical degradation. The band 105 may include a chemical resistant material. The band 105 may include an anti-static material. The band 105 include an oil-resistant material. The band 105 may include a UV resistant material. The band 105 may include a heat-resistant material. The band 105 may include a flexible material. The band 105 may include a durable material. In one example, the band 105 may include a material that withstands temperatures of equal to or greater than 300 degrees Fahrenheit. In another example, the band 105 may include a material that can withstand temperatures from about −40 degrees Fahrenheit to about 300 degrees Fahrenheit. In one embodiment, the band 105 can be made of nylon such as, for example, nylon 66.

Figure 5:
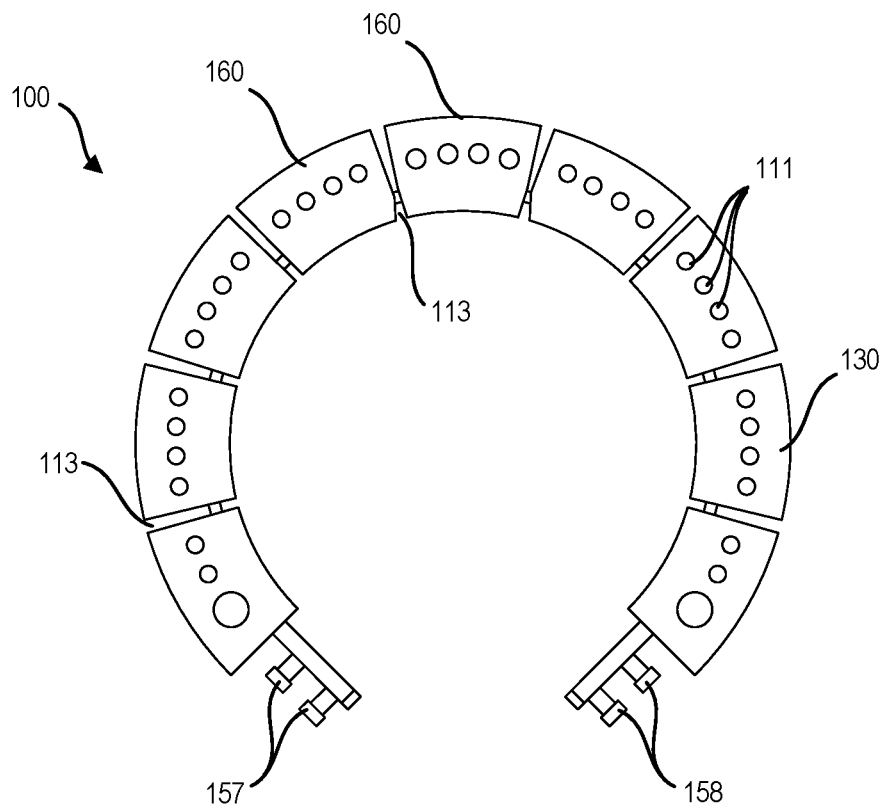
FIG. 5 shows a front view the information display apparatus of FIG. 1 without a signage panel or visual indicators.
Figure 6:
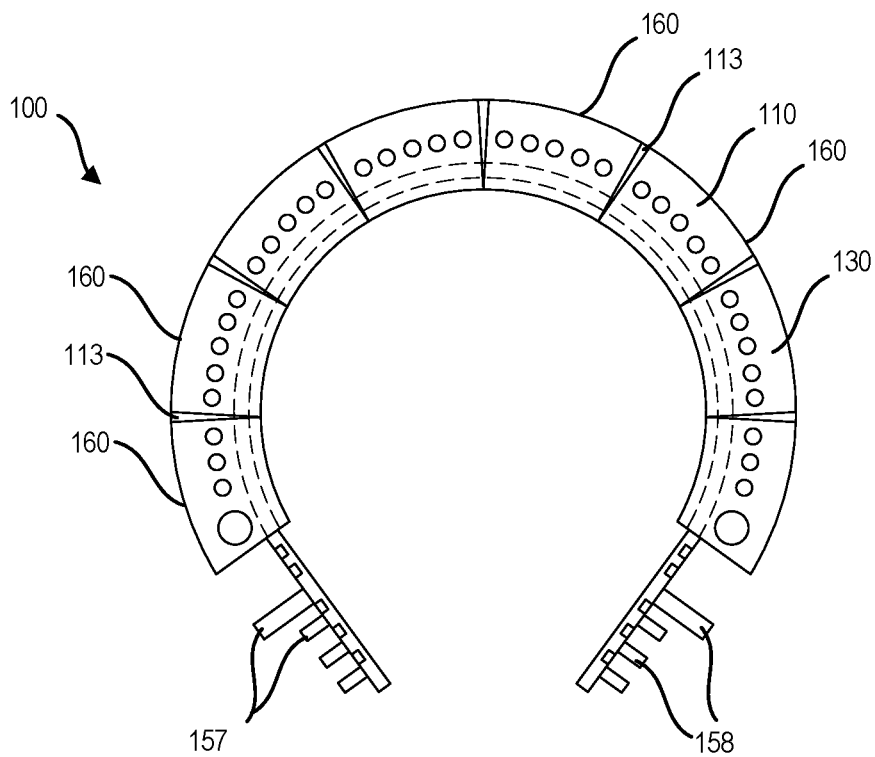
FIG. 6 shows a front view of a band and faceplate of an information display apparatus.
Figure 7:
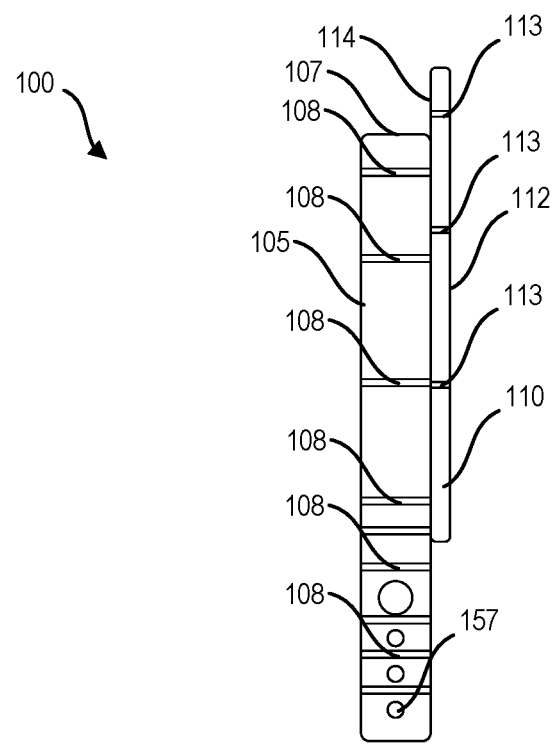
FIG. 7 shows a left side view of the band and faceplate of FIG. 6.

The information display apparatus 100 can include a faceplate 110. The faceplate 110 may extend outward and/or upward from the band 105. As shown in FIG. 7, the faceplate 110 may have a front surface 112 that is substantially perpendicular to an outer surface 107 of the band 105. The front surface 112 may be an arcuate front surface 112. The faceplate 110 can include a plurality of discrete mounting holes 111 in the front surface 112. Unlike a sliding track, discrete mounting holes 111 may prevent objects inserted in the mounting holes (e.g. visual indicators) from moving when inadvertently bumped by personnel. To improve flexibility and thereby allow the faceplate 110 to accommodate a range of industrial object shapes and sizes, the faceplate can include a plurality of segments 160. In the example of FIG. 1, the faceplate 110 may have nine discrete segments. In other examples, the faceplate 110 may have more than nine segments or fewer than nine segments. Between adjacent segments, a flexibility gap 113 may be provided. The flexibility gap 113 may provide clearance for the adjacent segments 160 to move relative to each other and thereby allow the faceplate to accommodate a range of industrial object circumferences. In one example, the flexibility gap 113 may extend from an inner perimeter 170 of the faceplate to the outer perimeter 171 of the faceplate 110. The flexibility gap 113 may have parallel sides. The flexibility gap 113 may have diverging sides that diverge from the inner perimeter 170 to the outer perimeter 171, as shown in FIG. 6. The flexibility gap 113 may have converging sides that converge from the inner perimeter 170 to the outer perimeter 171. The flexibility gap 113 may have converging sides and diverging sides, as shown in FIG. 5.

Figure 10:
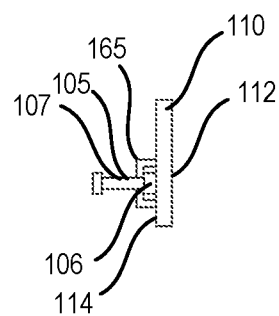
FIG. 10 shows a side cross-sectional view of a two-piece band and faceplate assembly.

The faceplate 110 and band 105 may be formed as a unitary part. Alternately, the faceplate 110 and band 105 may be separate parts that are detachable or permanently joined. In one example, shown in FIG. 10, the faceplate 110 may include a slot 165 on a rear surface 114 of the faceplate 105. The slot 165 may be a track. An edge portion 106 of the band 110 may be inserted into the slot 165 to removably join the band 110 to the faceplate 105. Allowing the faceplate 110 to be removed from the band 105 may allow worn or damaged parts to be easily serviced or replaced.

The faceplate 110 may include one or more materials that can withstand a range of temperatures and conditions relevant to an environment, equipment, or process that the faceplate 110 is exposed to without experiencing significant physical degradation. The faceplate 110 may include a chemical resistant material. The faceplate 110 may include an anti-static material. The faceplate 110 include an oil-resistant material. The faceplate 110 may include a UV resistant material. The faceplate 110 may include a heat-resistant material. The faceplate 110 may include a flexible material. The faceplate 110 may include a durable material. In one example, the faceplate 110 may include a material that withstands temperatures of equal to or greater than 300 degrees Fahrenheit. In another example, the faceplate 110 may include a material that can withstand temperatures from about −40 degrees Fahrenheit to about 300 degrees Fahrenheit. In one embodiment, the faceplate 110 can be made of nylon such as, for example, nylon 66.

Figure 2:
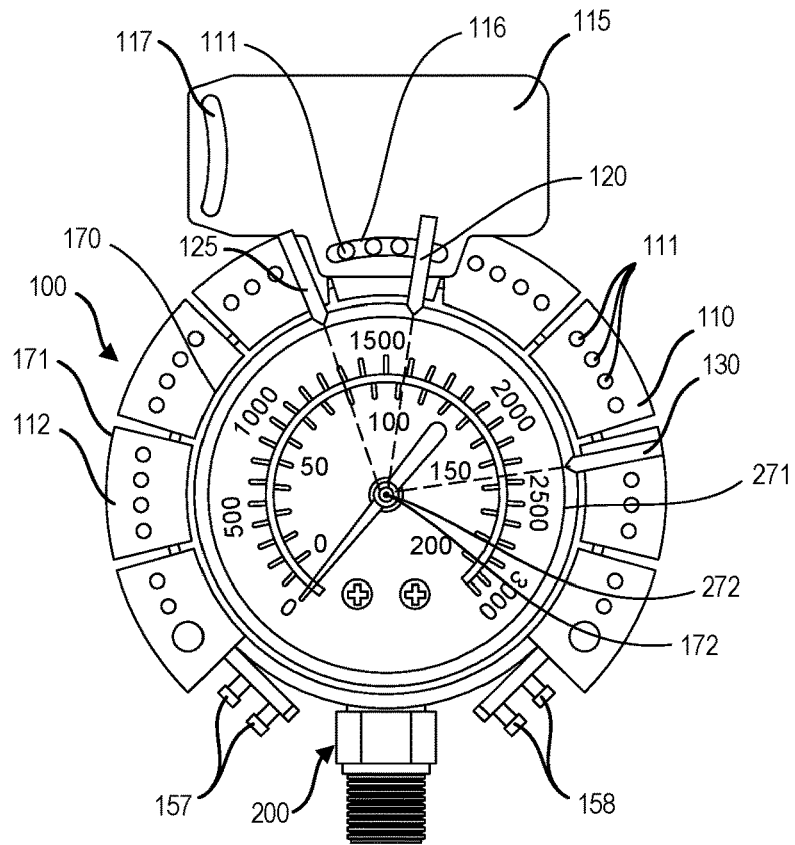
FIG. 2 shows a front view of the information display apparatus and industrial gauge of FIG. 1.
Figure 18:
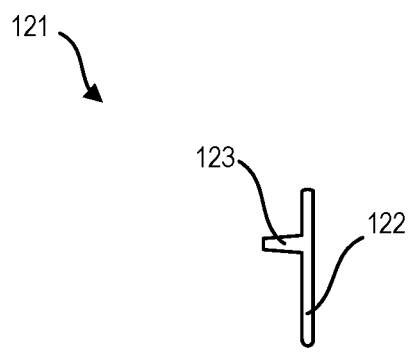
FIG. 18 shows a side view of a visual indicator having a mounting peg.

The information display apparatus 100 can include one or more visual indicators that attach to the faceplate 110. Each visual indicator 121 may include an indicator portion 122 and a mounting peg 123 extending from the indicator portion, as shown in FIG. 18. The mounting peg 123 may be configured to mate with one of the discrete mounting holes 111 in the faceplate 110. When the mounting peg 123 is inserted into a discrete mounting hole 111, the indicator portion 122 of the visual indicator may be configured to point toward a geometric center 272 of a face of the dial gauge 200, as shown in FIG. 2. When the mounting peg 123 is inserted into a discrete mounting hole 111, the indicator portion 122 of the visual indicator may be configured to point toward a geometric center 172 of the faceplate 110, as shown in FIG. 2

As shown in FIG. 1, one or more visual indicators (e.g. 120, 125, 130) may be used to designate a desired set point or an allowable range of values on the dial gauge. For example, the information display apparatus 100 may include a target setting indicator 120 that designates a target value for a process variable.

The information display apparatus 100 may include a lower limit indicator 125 that designates a lower boundary of a range of acceptable values. The information display 100 may include an upper limit indicator 130 that designates an upper boundary of the range of acceptable values. Together, the lower limit indicator 125 and upper limit indicator 130 may identify the range of acceptable parameter values, and the target setting indicator may identify a preferred parameter value located between the upper and lower limit indicators.

To enhance visual acuity, it may be desirable to provide visual contrast in the colors selected for the component parts. In one example, the faceplate 110 may be a light color, such as light grey, and the visual indicators may be color-coded. A combination of colors, such as blue, black, and red, that can be distinguished by personnel who are colorblind, may be used. In one example, the target value indicator 120 may be black, and the upper and lower limit indicators (125, 130) may be blue and/or red.

The visual indicators (e.g. 120, 125, 130) may include one or more materials that can withstand a range of temperatures and conditions relevant to an environment, equipment, or process that the visual indicators are exposed to without experiencing significant physical degradation. The visual indicators may include a chemical resistant material. The visual indicators may include an anti-static material. The visual indicators include an oil-resistant material. The visual indicators may include a UV resistant material. The visual indicators may include a heat-resistant material. The visual indicators may include a flexible material. The visual indicators may include a durable material. In one example, the visual indicators may include a material that withstands temperatures of equal to or greater than 300 degrees Fahrenheit. In another example, the visual indicators may include a material that can withstand temperatures from about −40 degrees Fahrenheit to about 300 degrees Fahrenheit. In one embodiment, the visual indicators can be made of nylon such as, for example, nylon 66.

Figure 17:
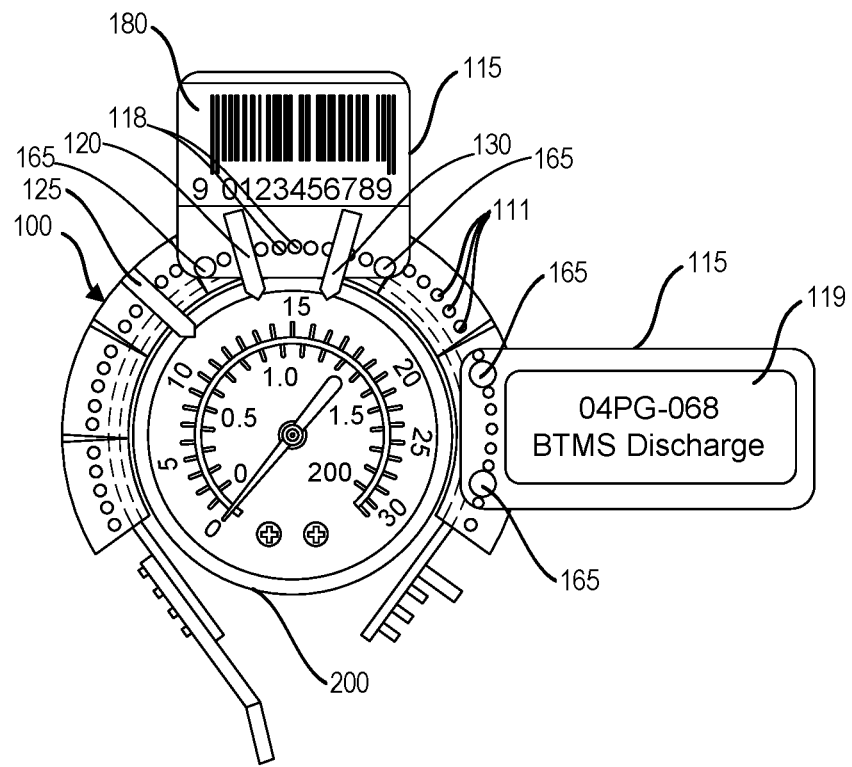
FIG. 17 shows a front view of an adjustable information display apparatus attached to a dial gauge, the apparatus having a first signage panel with a barcode and a second signage panel with identifying information about a process location.

The information display apparatus 100 can include a signage panel 115, as shown in FIG. 1. The signage panel 115 can removably attach to the faceplate 110. In one example shown in FIG. 1, the signage panel 115 can include an arcuate slot opening 116 to allow access to mounting holes 111 in the faceplate that are located behind the signage panel. As shown in FIG. 1, a visual indicator, such as the target setting indicator 120, can be inserted through the slot opening 116 and into one of the discrete mounting holes 111 to secure the signage panel 115 to the faceplate 110. In another example, as shown in FIG. 17, the arcuate opening 116 can be replaced by a plurality of discrete openings 118 having an arcuate arrangement that matches the arcuate arrangement of the plurality of discrete mounting holes 111 in the faceplate 110. The signage panel 115 can be attached to the faceplate 110 by one or more visual indicators (e.g. 120, 125, 130) inserted through one or more of the plurality of openings 118 and into the discrete mounting holes 111 of the faceplate. The signage panel 115 can be attached to the faceplate 110 by one or more fasteners 166 inserted through the plurality of openings 118 and into the discrete mounting holes 111 of the faceplate. The fasteners 166 may be similar to the visual indicators but may lack the indicator portion 122. In one example, the fasteners 166 may include a mounting peg extending from a fastener head.

The signage panel 115 may be used to record times and dates of inspection rounds and readings performed by personnel for the purpose of status tracking. The signage panel 115 may provide access to training materials, in either hardcopy or electronic version. The signage panel 115 may provide access to relevant documentation, such as instruction manuals for equipment or instrumentation. The signage panel 115 may identify pipeline type and location or equipment type. The signage panel may identify process type or flow direction.

The signage panel 115 can retain and present information about a process parameter. Parameter information can include any type of identifying information, such as facility location, fluid type, or parameter name. Parameter information may appear as alphanumeric information or as a machine-readable optical code (e.g. barcode or QR code). In one example, the parameter information can be printed directly on the signage panel 115. In another example, the signage panel 115 can include a transparent sleeve to receive an information card containing parameter information. In yet another example, parameter information can be printed on a sticker or other suitable material with an adhesive backing that can be applied to the front surface of the signage panel 115.

Information on the signage panel 115 may be updated manually. Alternately, information on the signage panel 115 may be updated electronically. In one example, as shown in FIG. 17, the information display apparatus 100 can receive digital parameter information through a wireless or wired connection, and the parameter information can be displayed on a digital display 119 that is attached to or integrated into the signage panel 115. The parameter information presented on the digital display 119 may be updated locally or remotely. Parameter information collected by a local gauge or sensor may be transmitted from the information display apparatus 100 to a local or remote computer for tracking purposes. The color of the digital display 119 may change color if the value of the process parameter is outside of an acceptable range of values. A color change may be easily identified by facility personnel, thereby enabling a faster response to return the value to the acceptable range of values.

The signage panel 115 may include one or more materials that can withstand a range of temperatures and conditions relevant to an environment, equipment, or process that the signage panel 115 is exposed to without experiencing significant physical degradation. The signage panel 115 may include a chemical resistant material. The signage panel 115 may include an anti-static material. The signage panel 115 include an oil-resistant material. The signage panel 115 may include a UV resistant material. The signage panel 115 may include a heat-resistant material. The signage panel 115 may include a flexible material. The signage panel 115 may include a durable material. In one example, the signage panel 115 may include a material that withstands temperatures of equal to or greater than 300 degrees Fahrenheit. In another example, the signage panel 115 may include a material that can withstand temperatures from about −40 degrees Fahrenheit to about 300 degrees Fahrenheit. In one embodiment, the signage panel 115 can be made of nylon such as, for example, nylon 66.

The information display apparatus 100 can include a securing portion 135. The securing portion 135 may be an elastic loop. The securing portion 135 may keep the band 105 in place on the industrial object by providing tension between a first end 155 of the band and a second end 156 of the band. An elastic securing band may allow a user to rapidly install the securing band without needing to tie a knot or take other steps to properly install the securing portion.

The band 105 may be configured to fit a variety of industrial objects having a range of circumference sizes and shapes. The band 105 may include a plurality of attachment features 157 on the first end 155. The band 105 may include a plurality of attachment features 158 on the second end 156. The attachment features (e.g. 157, 158) may be configured to retain the securing portion 135. In one example, the information display apparatus 100 may be supplied with an elastic securing portion 135. Having more than one attachment feature on each end of the band 105 may allow a user to easily find opposing attachment features (e.g. 157, 158) that are appropriately spaced to ensure proper tensioning of the elastic securing portion 135.

FIGS. 1 and 2 show an example of the information display apparatus 100 installed on a dial gauge 200. The apparatus 100 is shown with three visual indicators (120, 125, 130) and one signage panel 115. Due to their placement relative to a perimeter 271 of a face of the dial gauge 200, the visual indicators may avoid obscuring the face of the dial gauge. The signage panel 115 may include a first arcuate opening 116 proximate to a first edge of the signage panel and a second arcuate opening 117 proximate to a second edge of the signage panel. The first and second arcuate openings (116, 117) may facilitate mounting the signage panel 115 to the faceplate 110 in different orientations, which may be suitable for presenting informational documents in landscape or portrait orientations to enhance readability.

Figure 3:
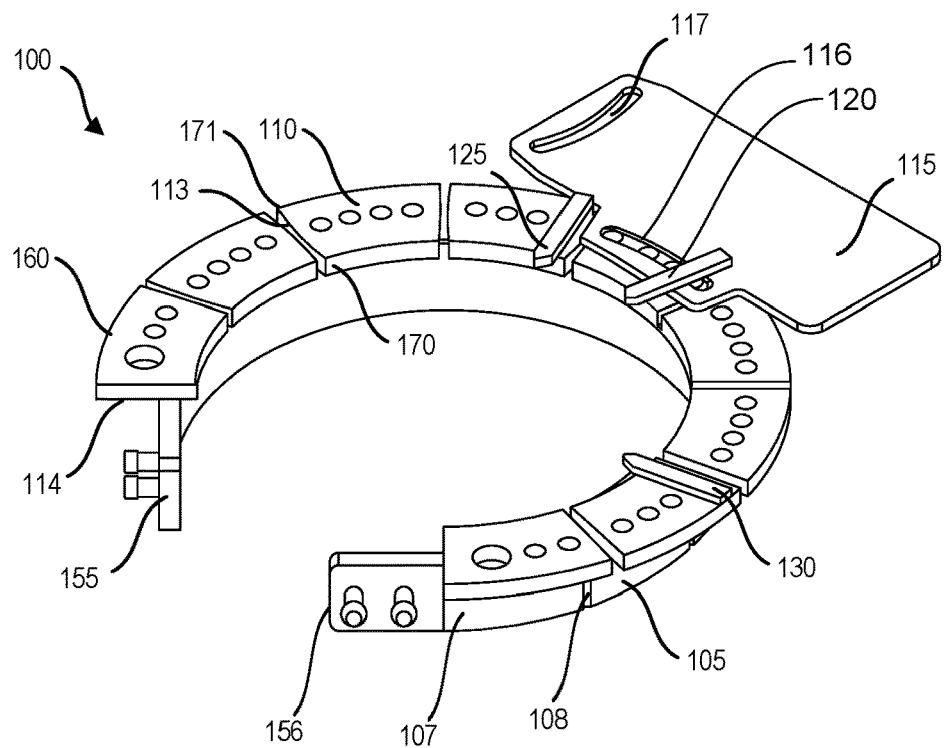
FIG. 3 shows a front perspective view of the information display apparatus of FIG. 1.
Figure 4:
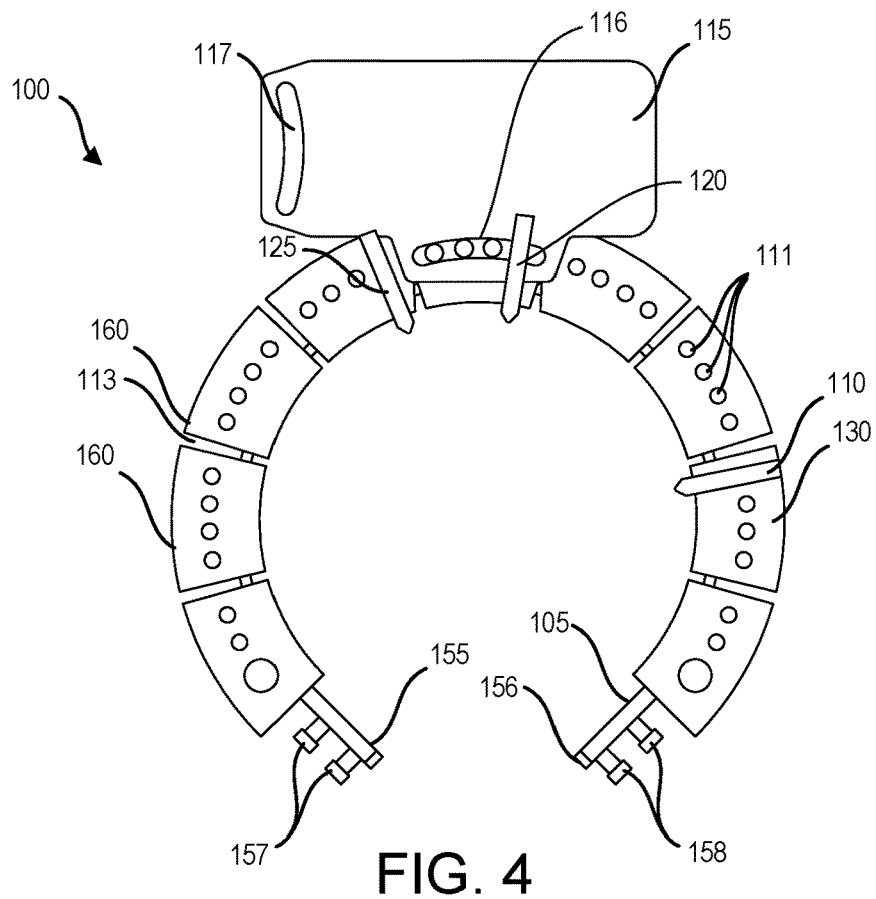
FIG. 4 shows a front view of the information display apparatus of FIG. 1.

FIGS. 3 and 4 show the information display apparatus 100 of FIG. 1 removed from the dial gauge 200. FIG. 5 shows the information display 100 of FIG. 3 without the signage panel 115 and visual indicators (120, 125, 130).

FIG. 6 shows an example of an information display apparatus 100. The faceplate may be divided into a plurality of interconnected segments 160. Neighboring segments 160 may be separated by a flexibility gap 113. The flexibility gap 113 may have sides that diverge from the inner perimeter 170 of the faceplate 110 to the outer perimeter of the faceplate. Flexibility gaps 113 may allow the faceplate 110 to flex and accommodate industrial objects with larger circumferences.

Figure 8:
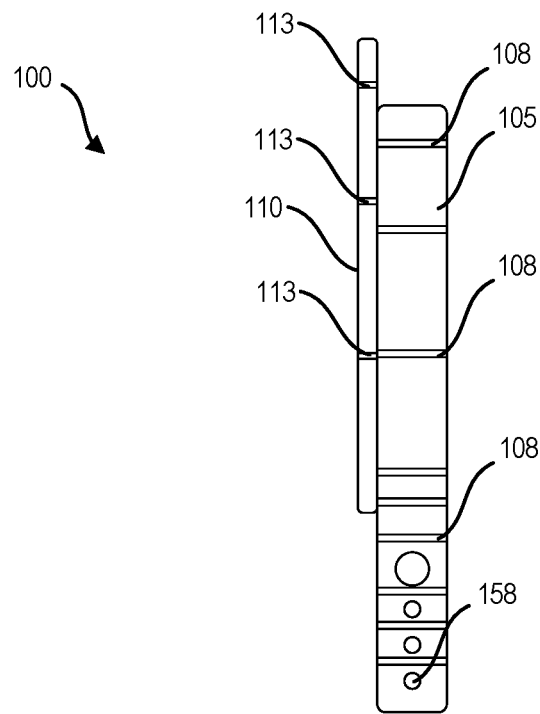
FIG. 8 shows a right side view of the band and faceplate of FIG. 6.

FIG. 7 shows a left side view of the information display apparatus 100 of FIG. 6. FIG. 8 shows a right side view of the information display apparatus 100 of FIG. 6. The band 105 may include a plurality of flexibility grooves 108 formed in the outer surface 107 of the band. The flexibility grooves 108 may allow the band to flex and accommodate a larger range of circumference sizes. In one example, along certain portions of the band 105, the flexibility grooves 108 may be substantially equally spaced. Proximate to the attachment features (157, 158), the flexibility grooves may be placed between adjacent attachment features, as shown in FIGS. 6-8. The faceplate 110 may include a plurality of flexibility gaps 113, as shown in FIGS. 6-8.

Figure 9:
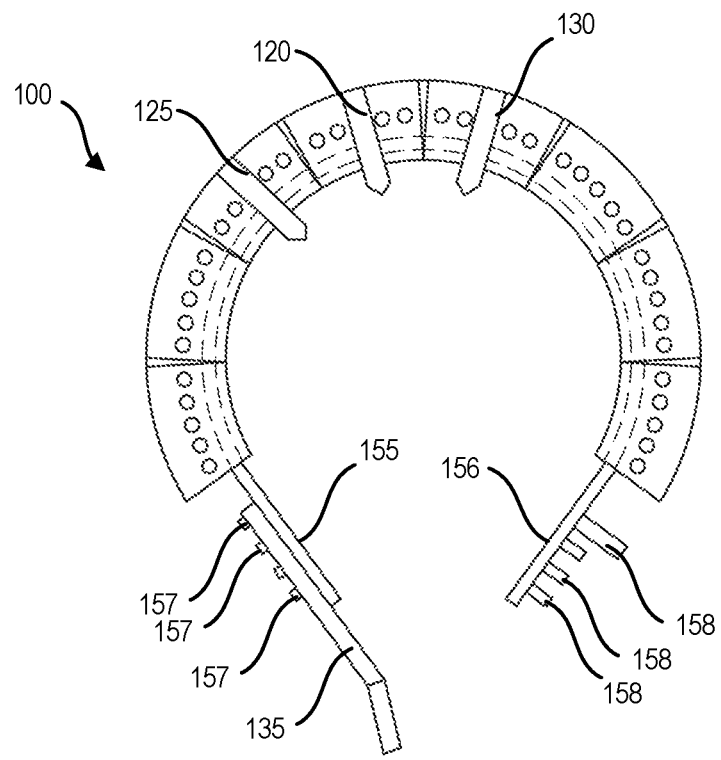
FIG. 9 shows a front view of the band and faceplate of FIG. 6 with three visual indicators and a securing portion.

FIG. 9 shows a front view of the information display apparatus 100 with three visual indicators (120, 125, 130) and a securing portion 135. The securing portion 135 is shown connected to an attachment feature 157 on the first end of the band 105. After the band 105 is installed around an object, the securing portion 135 can be tensioned by connecting it to one of the attachment features 158 on the second end 156 of the band 105. Providing a plurality of attachment features on each end of the band may allow a user to more easily find two attachment features that are suitably spaced apart to provide a desired amount of tension to ensure the band 105 remains in place on the object.

Figure 11:
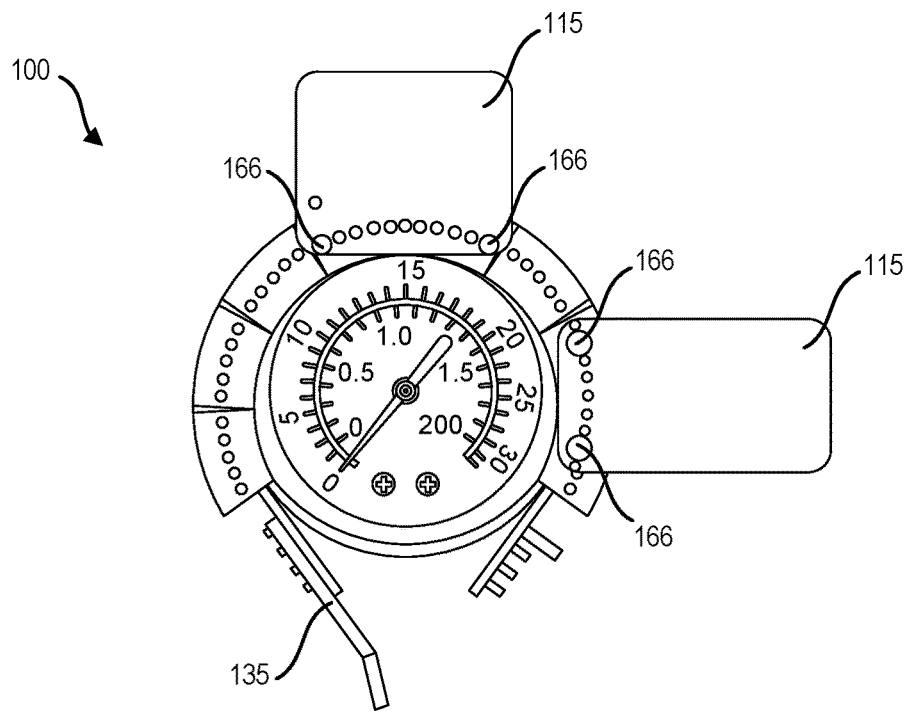
FIG. 11 shows a front view of an information display apparatus being installed on a dial gauge.
Figure 12:
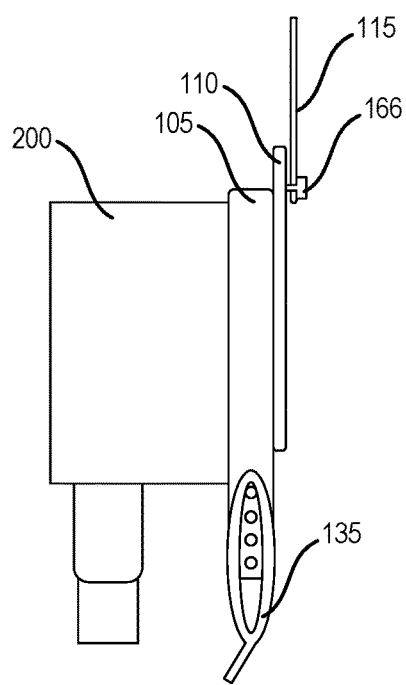
FIG. 12 shows a left side view of the information display apparatus and dial gauge of FIG. 11.

FIG. 11 shows a front view of an embodiment of the information display apparatus 100 installed on a dial gauge 200. The apparatus 100 is shown with two signage panels 115 attached to the faceplate 110 by fasteners 166. The apparatus 100 is shown with a securing portion 135 prior to tightening the securing portion. The signage panels 115 are shown prior to parameter information being added to the signage panels. FIG. 12 shows a left side view of the gauge and apparatus of FIG. 11.

Figure 13:
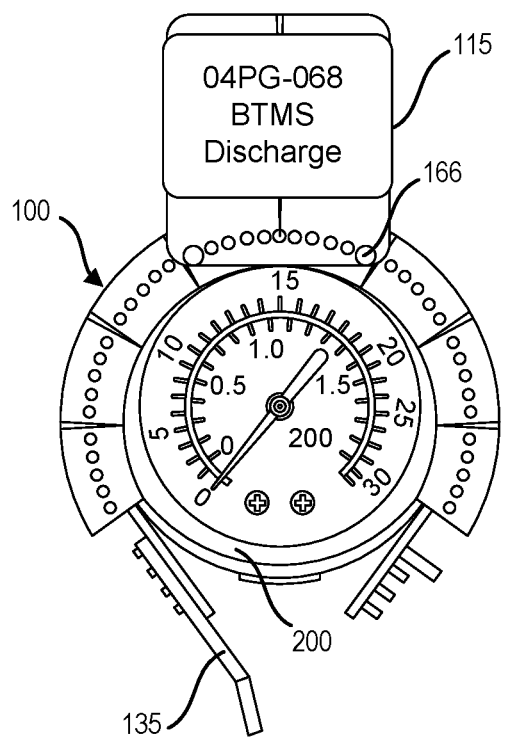
FIG. 13 shows a front view of an information display apparatus on a dial gauge, the information display apparatus having an adhesive label adhered to a signage panel.

FIG. 13 shows a front view of an embodiment of the information display apparatus 100 installed on a dial gauge 200. The apparatus 100 is shown with one signage panel 115 attached to the faceplate 110 by fasteners 166. The apparatus 100 is shown with a securing portion 135 prior to tightening the securing portion. In this example, the signage panel 115 contains parameter information relating to process function and facility location.

Figure 14:
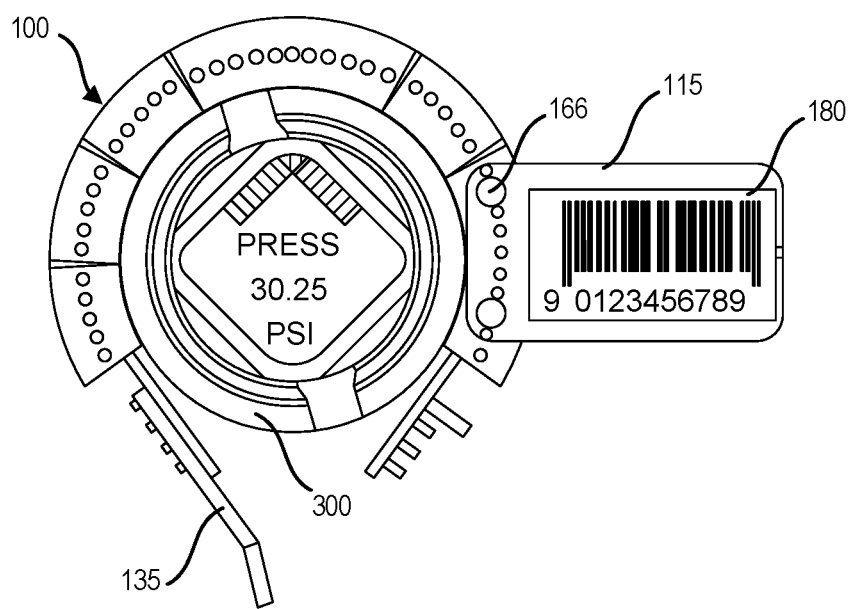
FIG. 14 shows a front view of an information display apparatus on a digital gauge, the information display apparatus having a signage panel with a bar code.

FIG. 14 shows a front view of an embodiment of the information display apparatus 100 installed on a digital gauge 300. The apparatus 100 is shown with one signage panel 115 attached to the faceplate 110 by fasteners 166. The apparatus 100 is shown with a securing portion 135 prior to tightening the securing portion. In this example, the signage panel 115 contains a machine-readable optical label 180, which may contain any type of useful parameter information.

Figure 15:
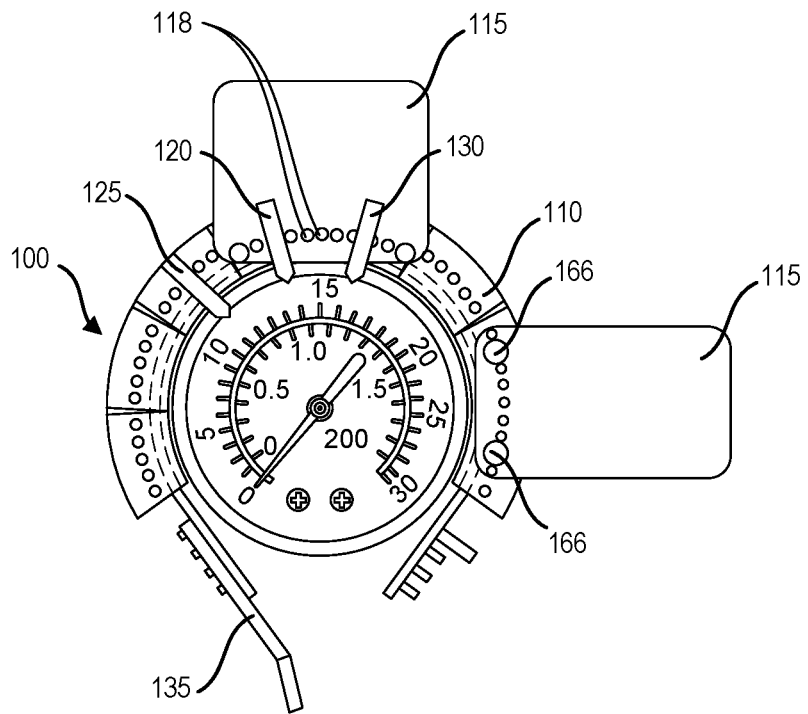
FIG. 15 shows a front view of an information display apparatus on a dial gauge, the information display apparatus having a first signage panel, a second signage panel, and three visual indicators.
Figure 16:
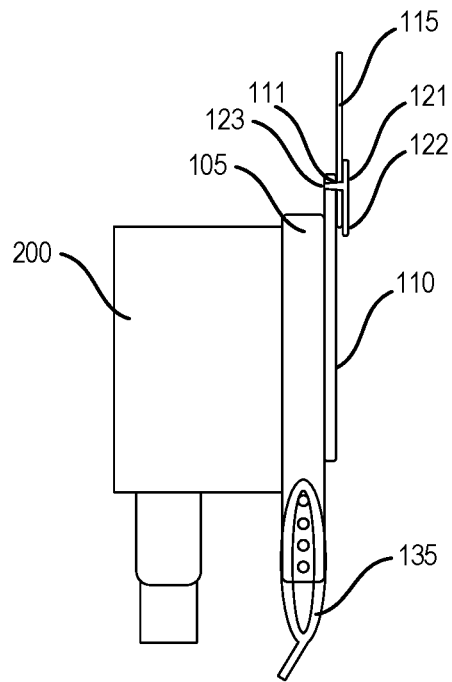
FIG. 16 shows a left side view of the information display apparatus and dial gauge of FIG. 15.

FIG. 15 shows a front view of an embodiment of the information display apparatus 100 installed on a dial gauge 200. The apparatus 100 is shown with two signage panels 115 attached to the faceplate 110. A first signage panel is attached to the faceplate 110 by fasteners 166, and a second signage panel is attached to the faceplate 110 by visual indicators (120, 130). The apparatus 100 is also shown with a securing portion 135 prior to tightening the securing portion. The signage panels 115 are shown prior to parameter information being added to the panels. FIG. 16 shows a left side view of the gauge and apparatus of FIG. 15. A portion of the signage panel 115 and faceplate are cut away to show how the peg 123 of the visual indicator extends through the opening in the signage panel and into the discrete mounting hole in the faceplate 110.

FIG. 17 shows a front view of the dial gauge 200 and apparatus of FIG. 15 after parameter information has been added to the signage panels 115. The first signage panel 115 may present parameter information through a machine-readable optical label. The second signage panel 115 may include parameter information presented in alphanumeric form on a digital display 119. In another example, a printed document can be used instead of the digital display 119. The printed document can be adhered to the signage panel 115 or retained in a transparent sleeve that is affixed to the signage panel. In still another example, alphanumeric information can be printed, etched, engraved, or otherwise formed directly on a surface of the signage panel 115.

Figure 19:
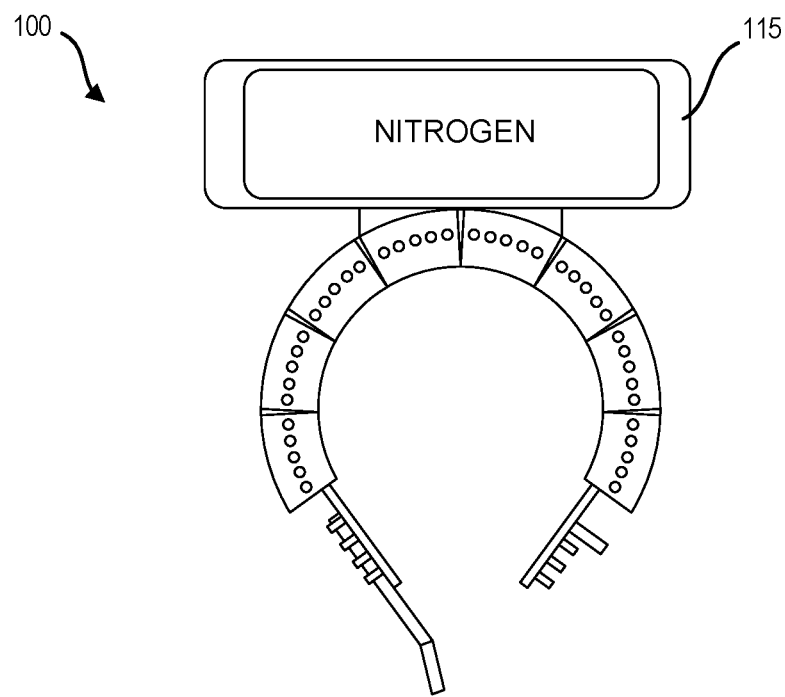
FIG. 19 shows a front view of an adjustable information display apparatus with a detachable signage panel identifying a fluid type.
Figure 20:
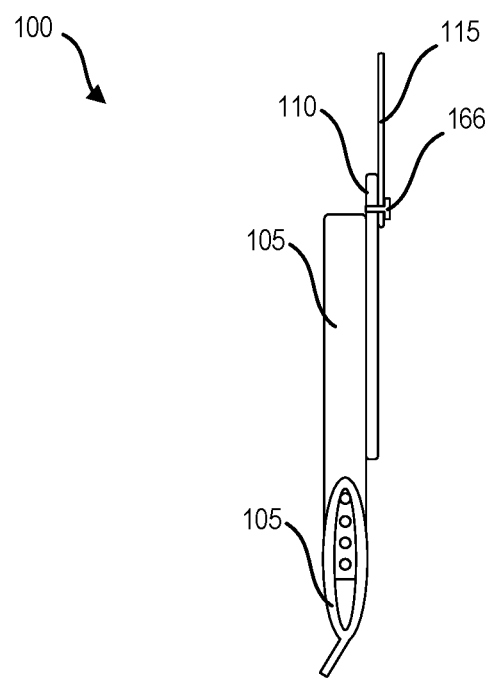
FIG. 20 shows a left side view of the adjustable information display apparatus of FIG. 19.

FIG. 19 shows a front view of an adjustable information display apparatus with a signage panel 115 identifying a fluid type. The signage panel 115 may include a color that is associated with fluid type. For example, in an industrial facility, a blue signage panel may indicate compressed air, a green signage panel may indicate natural gas, and a red signage panel may indicate fire water. Color coding the signage panels may allow personnel to more quickly and accurately identify pipes and equipment in the facility. Accurate identification of pipes and equipment may reduce errors and conserve time. FIG. 20 shows a left side view of the apparatus 100 of FIG. 19.

Figure 21:
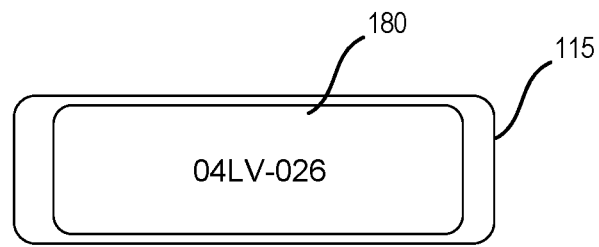
FIG. 21 shows a front view of an L-shaped signage panel.
Figure 22:
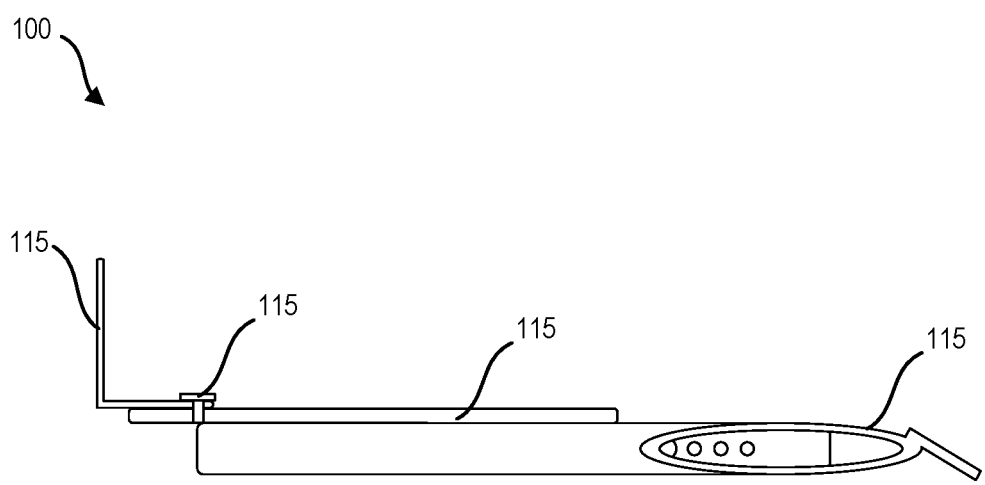
FIG. 22 shows a right side view of the L-shaped signage panel of FIG. 21 attached to an adjustable information display apparatus.
Figure 23:
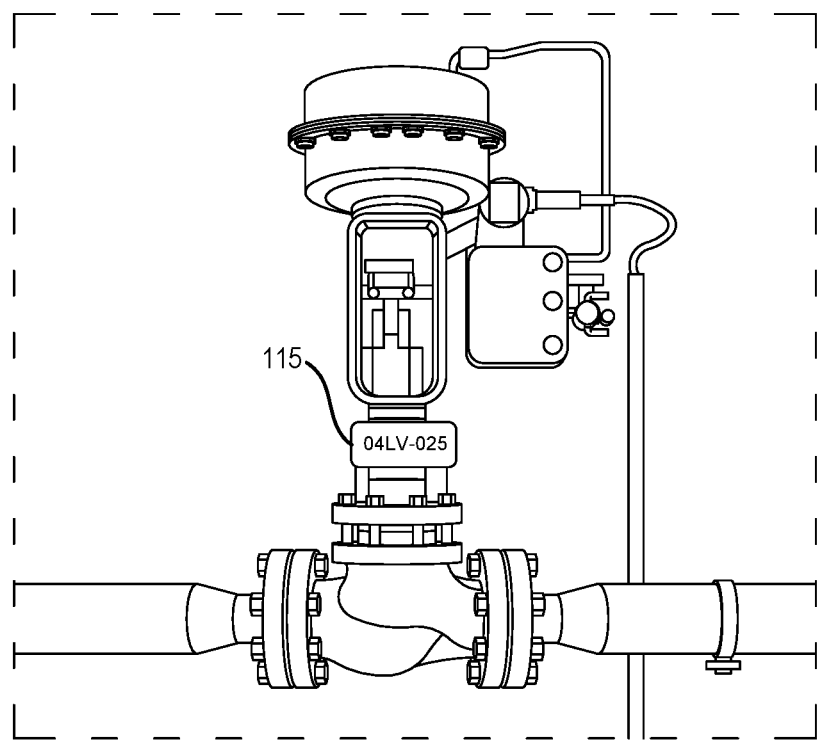
FIG. 23 shows a front view of the L-shaped signage panel of FIG. 21 attached to a horizontally mounted information display apparatus.
Figure 24:
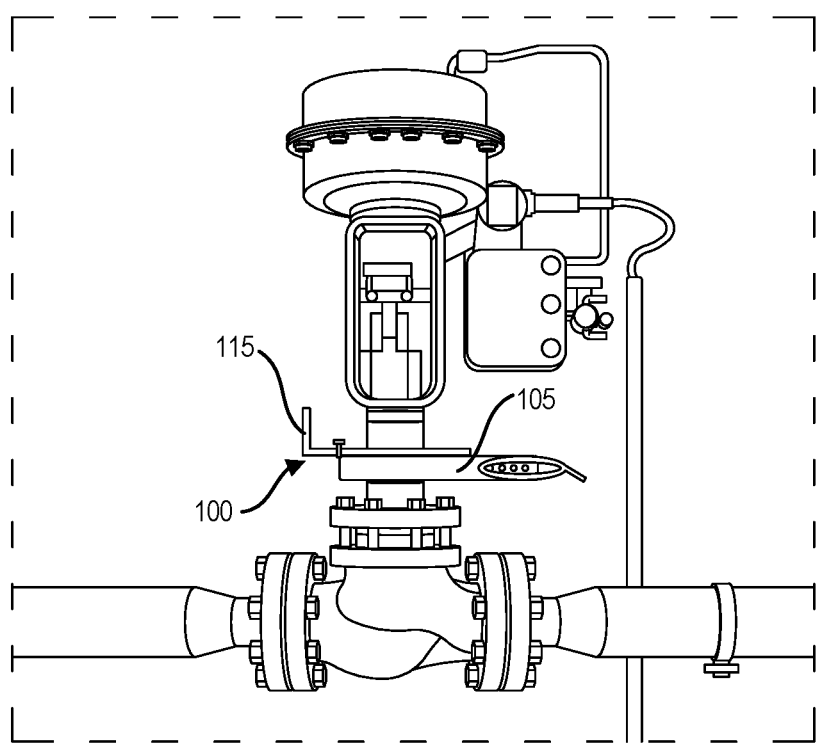
FIG. 24 shows a right side view of the L-shaped signage panel of FIG. 21 attached to a horizontally-mounted information display apparatus.

FIG. 21 shows a front view of an L-shaped signage panel 115. FIG. 22 shows a right side view of the L-shaped signage panel 115 of FIG. 21 attached to an adjustable information display apparatus 100. The L-shaped signage panel 115 is attached to the faceplate 110 by a fastener 166. The L-shaped signage panel allows the apparatus 100 to be attached to a vertical-oriented cylindrical object, such as a pipe or valve, and present the parameter information in a way that is easily readable by personnel in the facility. FIG. 23 shows a front view of the L-shaped signage panel of FIG. 21 attached to a horizontally mounted information display apparatus 100. FIG. 24 shows a right side view of the L-shaped signage panel of FIG. 21 attached to a horizontally-mounted information display apparatus 100.

Figure 25:
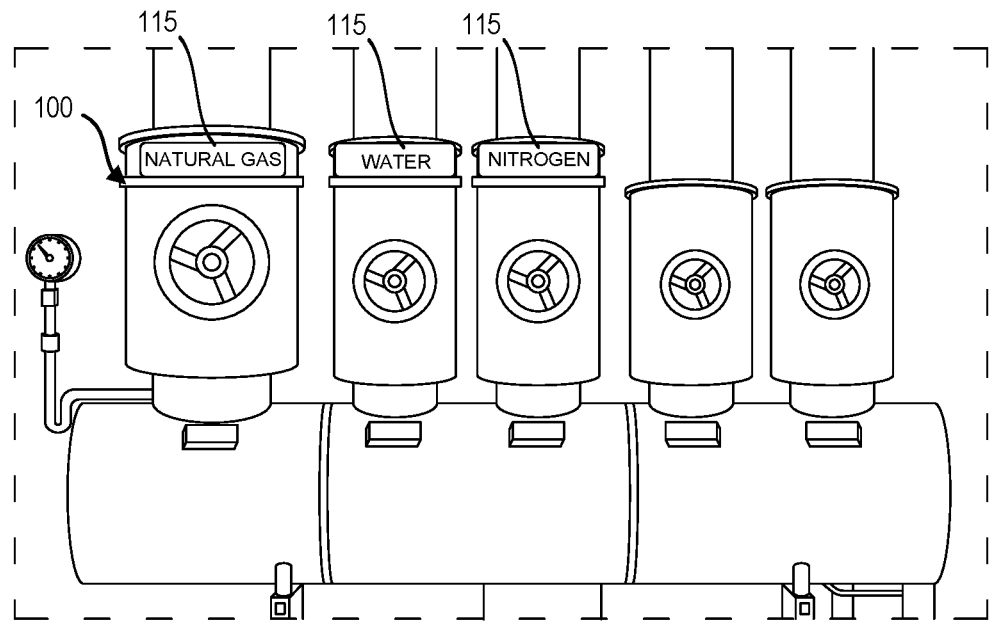
FIG. 25 shows a front view of three horizontally mounted information display apparatuses with signage panels identifying fluid types.

FIG. 25 shows a front view of three horizontally mounted information display apparatuses 100. The apparatuses 100 include signage panels 115 that identify fluid types. A first signage panel 115 identifies natural gas, a second signage panel 115 identifies water, and a third signage panel 115 identifies nitrogen.

Figure 26:
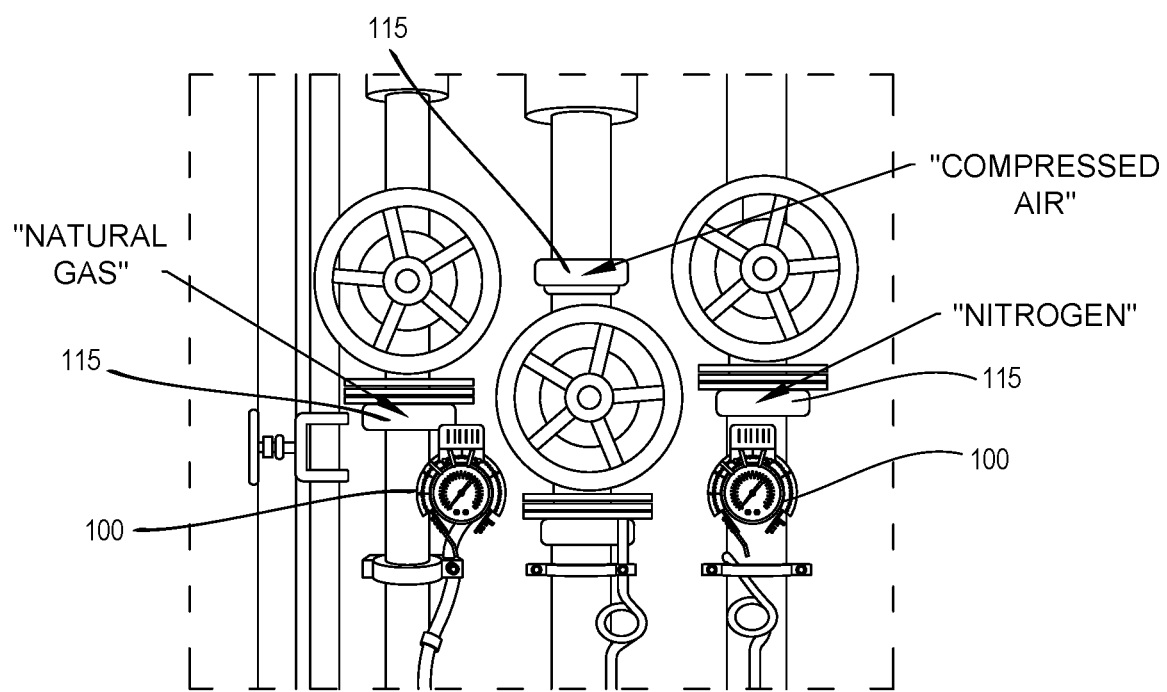
FIG. 26 shows a front view of three horizontally mounted information display apparatuses on pipes and two vertically mounted information display apparatuses on dial gauges.

FIG. 26 shows a front view of three horizontally mounted information display apparatuses 100 on pipes and two vertically mounted information display apparatuses 100 on dial gauges. Signage panels 115 on the horizontally mounted information display apparatuses identify natural gas, compressed air, and nitrogen. The signage panels may be color-coded to indicate gas type. For example, a signage panel 115 for natural gas may be green, a signage panel 115 for water may be blue, and signage panel 115 for nitrogen may be purple.

Figure 27:
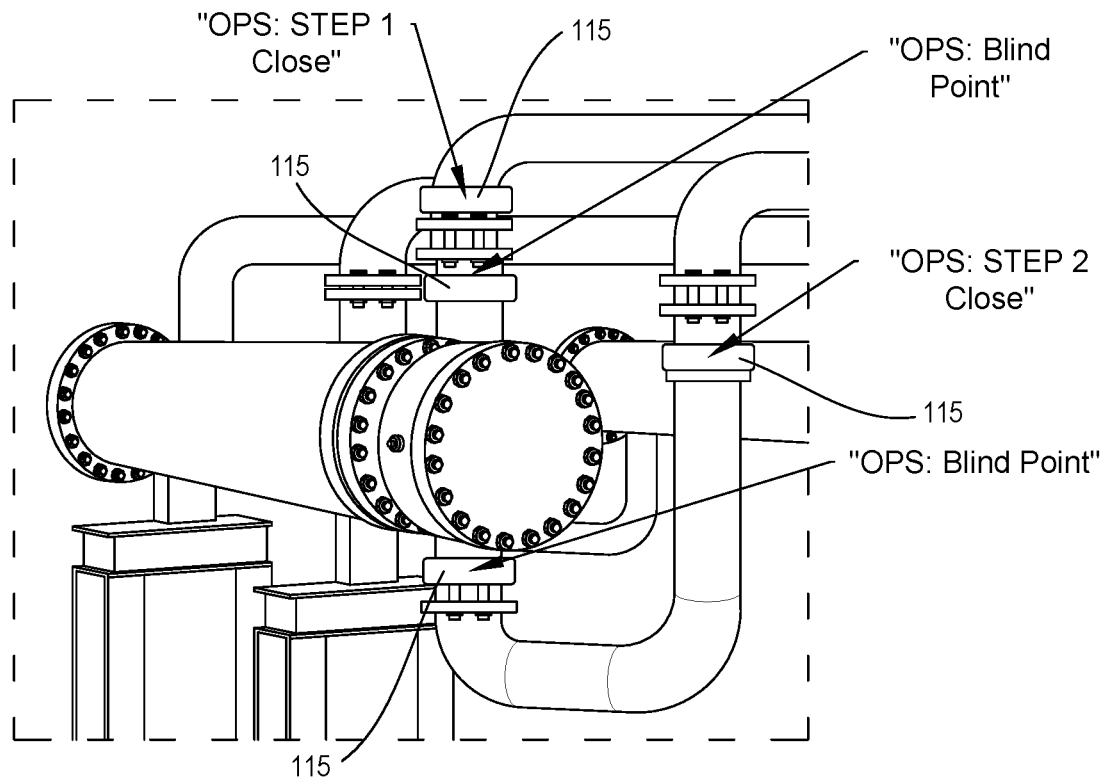
FIG. 27 shows a maintenance procedure integration utilizing adjustable information display apparatuses with signage panels presenting maintenance procedure steps and potential hazards.

In some examples, signage panels 115 described herein may be used to provide process information to assist personnel in maintaining a process, such as a refining process, within certain operating guidelines. In other examples, signage panels 115 can be used to aid personnel with maintenance tasks, thereby enhancing safety and reducing errors. FIG. 27 shows a maintenance procedure integration utilizing adjustable information displays 100 with signage panels 115 presenting maintenance procedure steps and potential hazards. By following the signage in a step-by-step manner, personnel may reduce errors, conserve time, and improve safety. In one example, signage panels 115 may identity certain valves to open or close prior to commencing maintenance work. In another example, signage panels may alert personnel of safety hazards such as confined spaces, high pressures, or high temperatures. The signage panels 115 may be installed for everyday safety instructions or for training field operators on facility operation.

Figure 28:
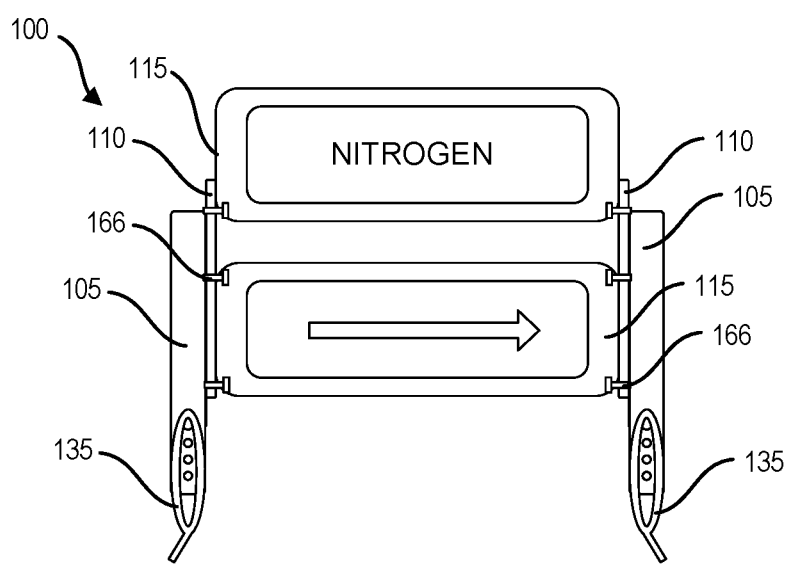
FIG. 28 shows an adjustable information display apparatus having two bands and signage panels extending between the two bands.

FIG. 28 shows an adjustable information display apparatus 100 having two bands 105, two faceplates 110, and two signage panels 115 extending between the two faceplates. The first band 105 may secure at a first location around a pipe 400 circumference, and the second band 105 may secure at a second location around a pipe circumference. The second location may be a predetermined distance from the first location. The signage panels 115 may have L-shaped ends with openings to accommodate fasteners 166 to attach the signage panels 115 to the faceplates 110. A first signage panel 115 may present a fluid type. A second signage panel 115 may present a flow direction of the fluid within the pipe 400.

Figure 29:
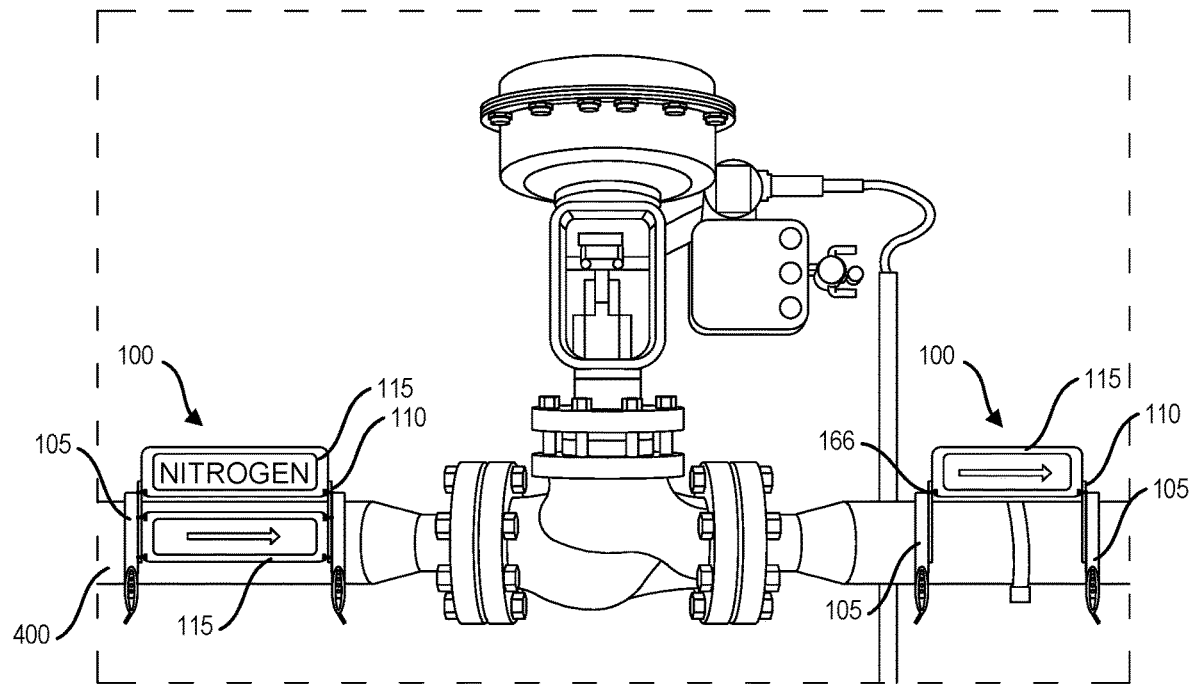
FIG. 29 shows two information display apparatuses in an industrial application.

FIG. 29 shows the adjustable information display apparatus 100 of FIG. 28 installed in an industrial application. FIG. 29 also shows a second adjustable information display apparatus 100 having two bands 105, two faceplates 110, and one signage panel 115 extending between the two faceplates 110. The signage panel 115 may have L-shaped ends with openings to accommodate fasteners 166 to attach the signage panel 115 to the two faceplates 110. The signage panel 115 may present a flow direction or fluid type.

Figure 30:
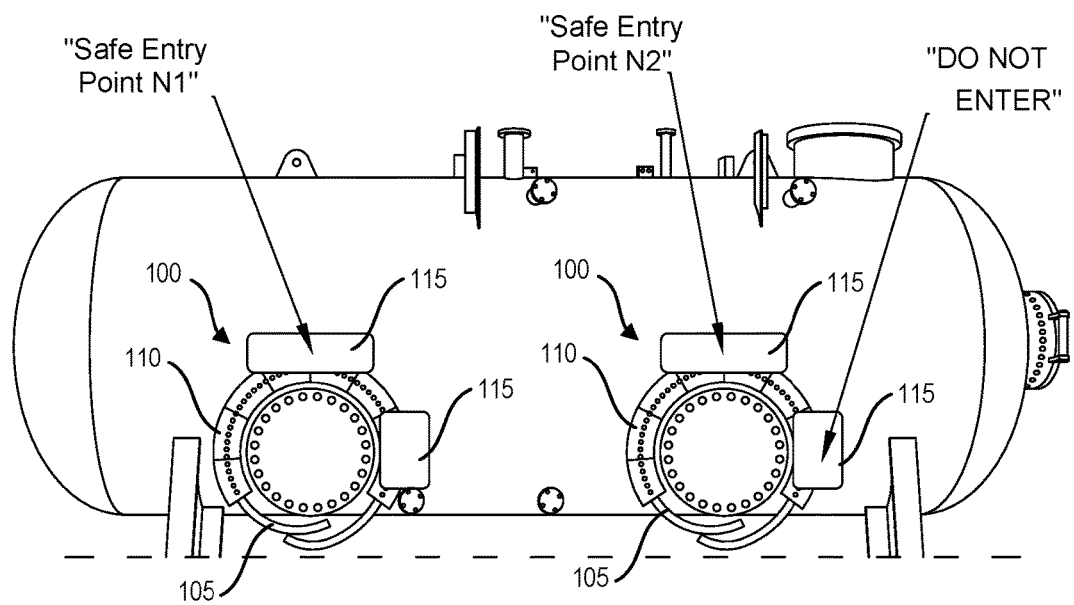
FIG. 30 shows a first adjustable information display apparatus with detachable signage panels and a second adjustable information display apparatus with detachable signage panels.

FIG. 30 shows a first adjustable information display apparatus 100 with two detachable signage panels 115. The first signage panel 115 may identify a safe entry point, and the second signage panel 115 may contain a document sleeve housing a regulatory permit. FIG. 30 shows a second adjustable information display apparatus 100 with two detachable signage panels 115. The first detachable signage panel 115 may identify a safe entry point, and the second detachable signage panel 115 may present a safety warning. In other examples, the signage panels 115 can present any useful type of information or data and/or provide a suitable way for field operators to record information for record-keeping purposes.

The faceplates 110 described herein can be used on panel-mounted gauges. Typically, panel-mounted gauges are mounted flush with a panel, so it may not be possible to secure the band 105 around a circumference of the gauge. In this example, the faceplate 110 can be separated from the band and adhered directly to the panel proximate to the gauge. Visual indicators can then be used to designate a target value and upper and lower limits.

Although the figures show apparatuses 100 with mounting holes in faceplates and mounting pegs on the detachable signage panels and visual indicators, this is not limiting. In other examples, the faceplates 110 can have mounting pegs, and the detachable signage panels and visual indicators can have mounting holes, thereby facilitating coupling of mating parts.

Figure 31:
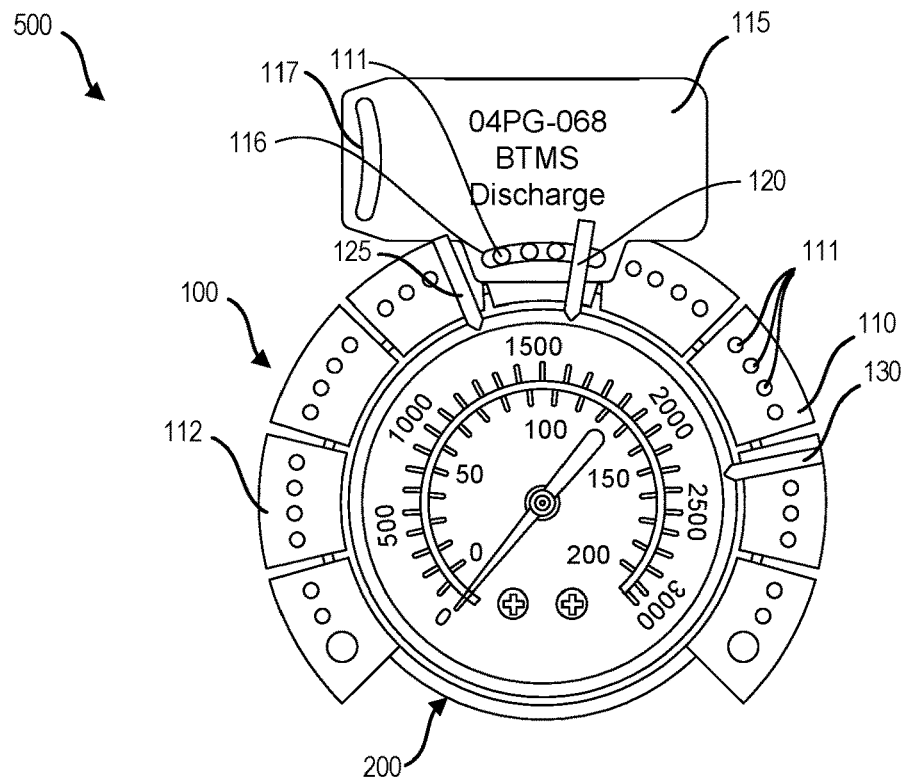
FIG. 31 shows a computer rendering of a gauge and an information display apparatus.

Physical instrumentation may be replaced by digital sensors. For example, a dial gauge may be replaced by a digital sensor connected to a computer. Rather than simply present numeric values on a computer screen, field personnel may prefer to view a computer rendering of a dial gauge on a computer screen. To aid the field personnel in interpreting the reading, the computer rendering may also include an information display apparatus 100 similar to those presented herein. FIG. 31 shows a computer rendering 500 of a dial gauge 200 and an information display apparatus 100. The information display apparatus 100 may include one or more visual indicators (e.g. 120, 125, 130). The visual indicators may designate a desired set point or an allowable range of values on the dial gauge. For example, the information display apparatus 100 may include a target setting indicator 120 that designates a target value for a process variable. The information display apparatus 100 may include a lower limit indicator 125 that designates a lower boundary of a range of acceptable values. The information display 100 may include an upper limit indicator 130 that designates an upper boundary of the range of acceptable values. Together, the lower limit indicator 125 and upper limit indicator 130 may identify the range of acceptable parameter values, and the target setting indicator may identify a preferred parameter value located between the upper and lower limit indicators. To enhance visual acuity, it may be desirable to provide visual contrast in the colors selected for the component parts. In one example, the faceplate 110 may be a light color, such as light grey, and the visual indicators may be color-coded. Colors, such as blue, black, and red, may be used. In one example, the target value indicator 120 may be black, and the upper and lower limit indicators (125, 130) may be blue and/or red.

Figure 32:
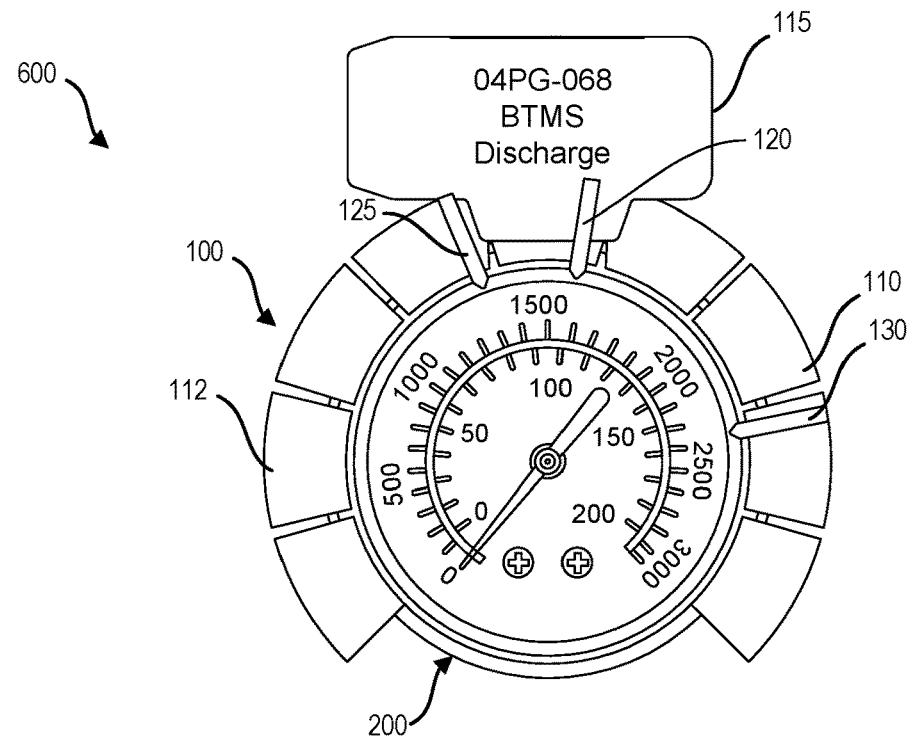
FIG. 32 shows a computer rendering of a gauge and an information display apparatus.
Figure 33:
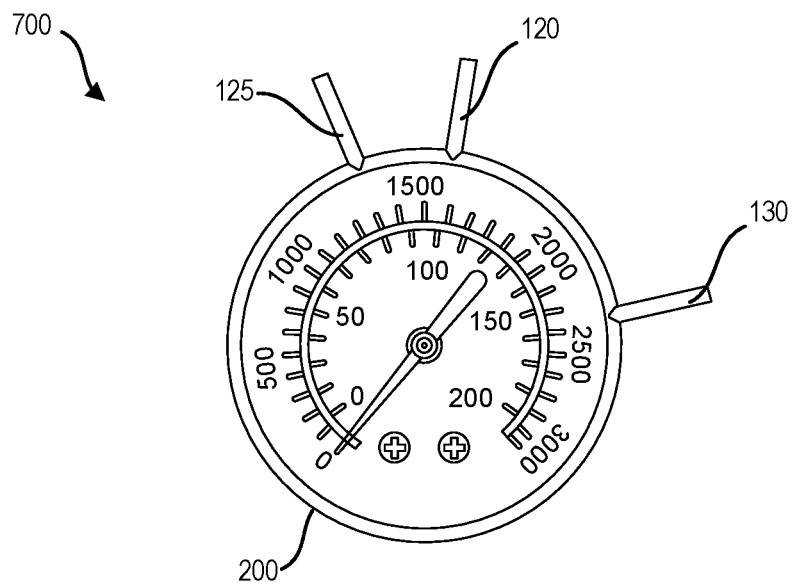
FIG. 33 shows a computer rendering of a gauge and visual indicators.

In some examples, the computer rendering may be simplified to minimize distraction and allow a field operator to focus on critical information. FIG. 32 shows a computer rendering 600 of a dial gauge and an information display apparatus 100 with mounting holes omitted. FIG. 33 shows a computer rendering 700 of a dial gauge 200 and a plurality of visual indicators (120, 125, 130). A computer connected to the display monitor may allow the user to adjust locations of the visual indicators by dragging the indicators with a mouse or touchscreen or by entering numeric values through a keyboard, touchscreen, or other suitable device.

Figure 34:
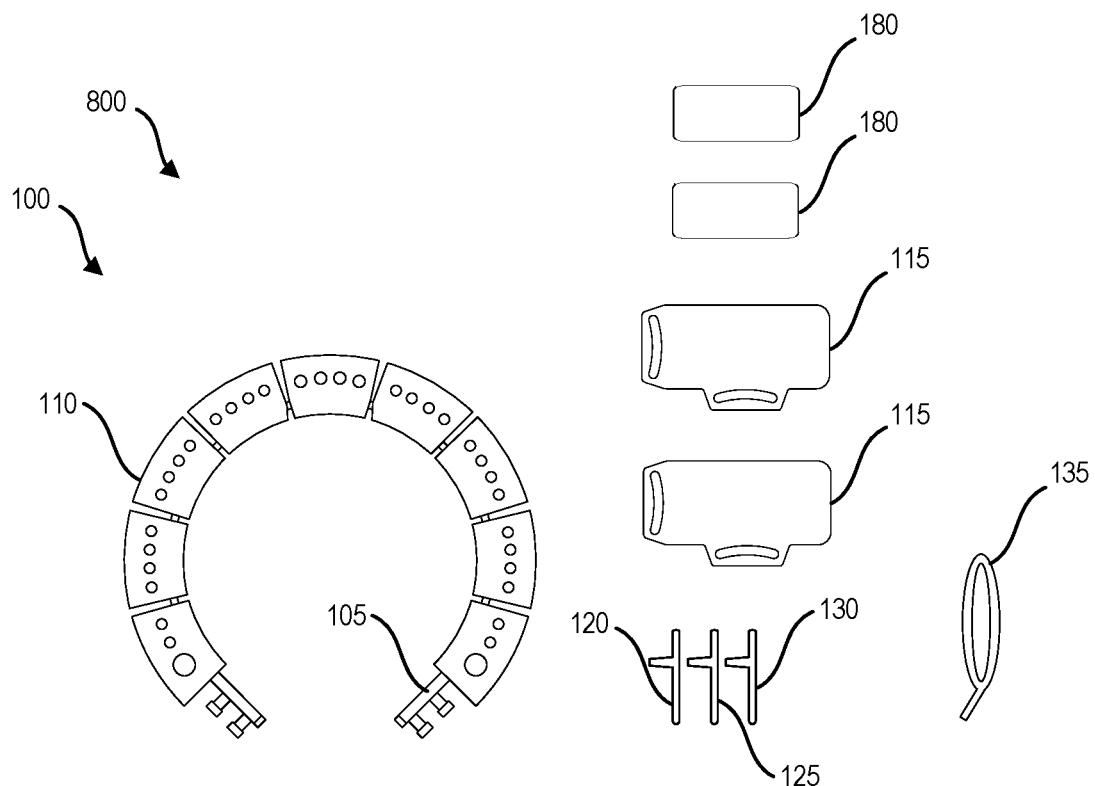
FIG. 34 shows an example of an information display kit.

The information display apparatus 100 may be highly versatile and adapted across a wide variety of applications. To enhance versatility, the apparatus 100 may be provided as a kit of components that can be assembled by a user to meet the needs of a particular application. FIG. 34 shows one example of an information display kit 800. In one example, the kit 800 may include a band 105 and faceplate 100, either attached or as separate components. The kit 800 may include one or more visual indicators (e.g. 120, 125, 130). The kit 800 may include one or more signage panels 115. The kit 800 may include one or more securing portions 135. In one example, the kit 800 may be provided as a prepackaged kit containing all necessary components for a particular application. In another example, the kit 800 may be provided as a user-configured kit where a user selects items to be included in the kit. In yet another, the kit 800 may be provided as a maintenance kit or a spare part kit that includes one or more components that may be used to replace worn, damaged, or lost components. The kit 800 can include suitable packaging. The kit 800 can include an instruction manual. The kit 800 can include one or more labels 180 attachable to the one or more signage panels 115. The one or more labels 180 may have adhesive backing. The one or more labels 180 may include a front surface upon which alphanumeric information or machine-readable information can be printed.

The methods and compositions of the present invention can comprise, consist of, or consist essentially of the essential elements and limitations described herein, as well as any additional or optional steps, components, or limitations described herein or otherwise useful in the art.

It is understood that the invention is not confined to the particular construction and arrangement of parts herein illustrated and described, but embraces such modified forms thereof as come within the scope of the claims.

The foregoing description has been presented for purposes of illustration and description. It is not intended to be exhaustive or to limit the claims to the embodiments disclosed. Other modifications and variations may be possible in view of the above teachings. The embodiments were chosen and described to explain the principles of the invention and its practical application to enable others skilled in the art to best utilize the invention in various embodiments and various modifications as are suited to the particular use contemplated. It is intended that the claims be construed to include other alternative embodiments of the invention except insofar as limited by the prior art.

What is claimed is:

1. An adjustable information display apparatus comprising:
    a band removably securable around an exterior circumference of an object, wherein the band is adjustable to accommodate a range of exterior circumference sizes; and
    a faceplate extending from the band, the faceplate having an arcuate front surface that is substantially perpendicular to an outer surface of the band, the arcuate front surface having a plurality of discrete mounting holes arranged in an arcuate configuration, each of said discrete mounting hole mounting hole configured to receive a mounting peg; and
    a first visual indicator having a first indicator portion and a first mounting peg extending from the first indicator portion, the first mounting peg configured to fit in one of the plurality of discrete mounting holes.

2. The apparatus of claim 1, wherein the first indicator portion of the first visual indicator is configured to point toward a geometric center of the faceplate when the first mounting peg is installed in one of the discrete mounting holes.

3. The apparatus of claim 1, further comprising a signage panel that is removable attachable to the arcuate front surface of the faceplate, the signage panel comprising an arcuate opening, wherein the arcuate opening conforms to the arcuate configuration of the discrete mounting holes.

4. The apparatus of claim 1, further comprising:
    a second visual indicator comprising a second indicator portion and a second mounting peg extending from the second indicator portion, the second mounting peg configured to fit in at least one of the discrete mounting holes; and
    a third visual indicator comprising a third indicator portion and a third mounting peg extending from the third indicator portion, the third mounting peg configured to fit in at least one of the discrete mounting holes,
    wherein the first visual indicator is a target setting indicator, the second visual indicator is a lower limit indicator, and the third visual indicator is an upper limit indicator.

5. The apparatus of claim 1, wherein the faceplate comprises a plurality of segments, wherein a first segment and a second segment of the plurality of segments are separated by a flexibility gap that extends from an inner perimeter of the faceplate to an outer perimeter of the faceplate.

6. The apparatus of claim 1, the band further comprising a plurality of flexibility grooves extending across the outer surface of the band.

7. The apparatus of claim 1, further comprising a slot on a rear surface of the faceplate, wherein the slot is configured to receive an edge portion of the band to attach the faceplate to the band.

8. An adjustable information display apparatus comprising:
    a band removably securable around an exterior circumference of an industrial object, wherein the band is adjustable to accommodate a range of exterior circumference sizes; and
    a faceplate extending from the band, the faceplate having an arcuate front surface that is substantially perpendicular to an outer surface of the band, the arcuate front surface having a plurality of discrete mounting holes arranged in an arcuate configuration; and
    a signage panel that is removable attachable to the arcuate front surface of the faceplate, the signage panel comprising a first arcuate opening, wherein the first arcuate opening conforms to the arcuate configuration of the discrete mounting holes; and
    a mounting peg configured to extend through the arcuate opening and into one of the plurality of discrete mounting holes to secure the signage panel to the faceplate.

9. The apparatus of claim 8, wherein the first arcuate opening is located proximate to a first edge of the signage panel, the signage panel further comprising a second arcuate opening located proximate to a second edge of the signage panel, wherein the second arcuate opening conforms to the arcuate configuration of the discrete mounting holes.

10. The apparatus of claim 8, wherein the mounting peg is part of a visual indicator, the visual indicator comprising an indicator portion extending from the mounting peg.

11. The apparatus of claim 8, wherein the signage panel comprises a document sleeve configured to receive a document containing parameter information.

12. The apparatus of claim 8, wherein the signage panel comprises a machine-readable optical label.

13. The apparatus of claim 8, wherein the apparatus comprises a heat-resistant material capable of withstanding temperatures up to at least 300 degrees Fahrenheit.

14. The apparatus of claim 8, wherein the apparatus comprises a chemical resistant material.

15. The apparatus of claim 8, wherein the apparatus comprises an anti-static material.

16. The apparatus of claim 1, wherein the band comprises a raised edge portion and the faceplate comprises a track configured to receive the raised edge portion thereby removably coupling the faceplate to the band.

17. An information display kit for industrial applications, the kit comprising:
    a band removably securable around an exterior circumference of an industrial object, wherein the band is adjustable to accommodate a range of exterior circumference sizes;
    a faceplate having an arcuate front surface that is substantially perpendicular to an outer surface of the band, the arcuate front surface having a plurality of discrete mounting holes arranged in an arcuate configuration; and
    at least one detachable component having a mounting peg insertable into one of the plurality of discrete mounting holes, wherein the at least one detachable component conveys parameter information through position, color, text, or machine-readable optical label.

18. The kit of claim 17, wherein the at least one detachable component comprises a first visual indicator having a first color and a second visual indicator having a second color.

19. The kit of claim 17, further comprising an elastic securing portion configured to secure a first end of the band to a second end of the band.

20. The kit of claim 17, wherein the at least one detachable component comprises a signage panel and a fastener comprising the mounting peg, the mounting peg configured to extend through an arcuate opening in the signage panel and into one of the plurality of discrete mounting holes to secure the signage panel to the faceplate.

* * * * *